April 23, 1968   J. A. SOULES ET AL   3,379,998

LASER IMAGE AMPLIFYING SYSTEM

Filed July 9, 1964

INVENTORS
FRANCIS T. BYRNE
JACK A. SOULES

3,379,998
LASER IMAGE AMPLIFYING SYSTEM
Jack A. Soules, Box 1615, University Park, N. Mex. 88070, and Francis T. Byrne, 123 Hamilton Ave., Silver Spring, Md. 20901
Filed July 9, 1964, Ser. No. 381,591
5 Claims. (Cl. 331—94.5)

ABSTRACT OF THE DISCLOSURE

This invention is directed to a laser amplifying system including axially aligned laser oscillators which are operative between reflective mirrors and with a lens between the oscillators. A desired picture or image is projected onto the fully reflective mirror. The image changes the reflectivity in the areas of the image, thus, oscillations cease corresponding to those areas covered by the image. Therefore, light passing through the partially reflective mirror will present an outline of the image on the fully reflective mirror.

---

The invention described herein may be manufactured and used by or for the Government of the United States of America for governmental purposes without the payment of any royalties thereon or therefor.

The present invention relates to a laser system and more particularly to an optical image amplifying system using at least two separate laser generators or oscillators.

Heretofore, it has been proposed that lasers be used as high intensity light sources for drilling holes in diamonds, cutting metals, communications systems, as a carrier of intelligence and for scientific experimentation, as well as for technological and military purposes.

It is well known that a successful operation of an optical laser requires optical cavity end plates of high reflectivity in order to establish the necessary conditions for oscillation. In typical cases, a change in reflectivity of one end mirror from about 99% to about 98% causes oscillations to cease. In the present invention, image amplifications with a very high gain is made possible by modifying the reflectivity of certain areas of one of the mirrors thereby controlling the oscillation mode of the lasers affected by the modified reflectivity area.

It is therefore an object of the present invention to provide a high gain optical image amplifying system.

Another object is to provide a system for transmitting an image by use of a laser.

Still another object is to provide a system for projecting an invisible image into a visible image.

Yet another object is to transmit an electron image into a visible image.

While still another object is to project an infrared or ultraviolet image into a visible image.

Another object is to project a visible image into a more intense visible image.

Figure 1:
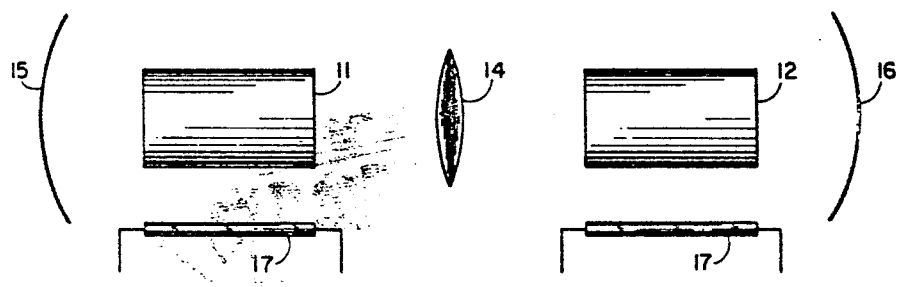
Figure 2:
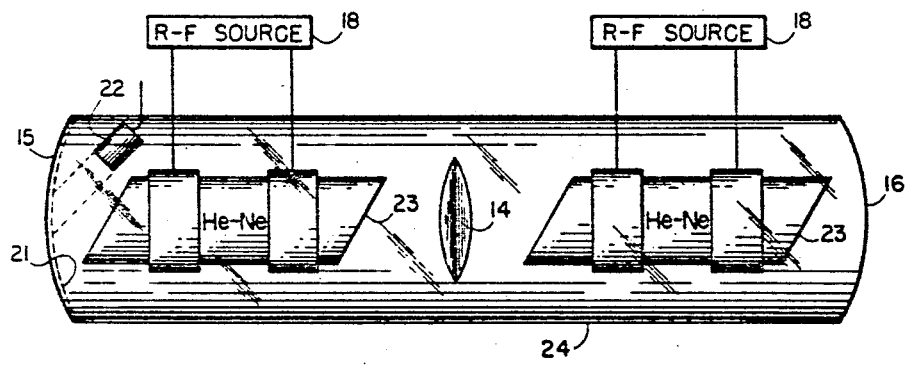

Other objects and advantages of the invention will hereinafter become more fully apparent from the following description of the annexed drawing, wherein FIG. 1 illustrates a laser system for carrying out the invention; and FIG. 2 illustrates a modification of the system shown by illustration in FIG. 1.

The present invention is directed to an optical amplifying system that makes use of two separate axially aligned laser units spaced from each other with spherical reflector surfaces of high reflectivity opposite the outer ends of each laser unit. An optical lens is positioned between the adjacent ends of the laser units relative to the reflective surfaces such that the distance from the lens to each respective surface is equal to the radius of curvature of each of the respective reflective surfaces and such that the lens images one reflecting surface on the other and vice versa.

As usual, in laser operation one of the reflective surfaces of high reflectivity is fully reflective while the other reflective surface is partially reflective. The laser unit may be operated either as a continuous wave or pulsed and may be of any suitable type. As an example, the laser may be a gas type, typically excited by an RF discharge, or any other laser operating at a low level of optical pumping such that gain control is accomplished by control of the reflectivity of the cavity mirror. A desired picture or image is projected or applied to the surface of the fully reflective mirror which changes the reflectivity in the areas of the image. Thus oscillations in the laser cease corresponding to those areas flooded by the image projected or applied onto the fully reflective surface. The light waves produced in the laser not affected by the image will continue to oscillate and will emerge from the partially reflective surface through those areas on the partially reflective surface which are not affected by the image on the fully reflective surface. The intensity at the imaged points on the partially reflective surface is determined by the gain in the laser material and the reflectivity of the fully reflective surface which is imaged on the corresponding points of reflectivity on the partially reflective surface. Thus, the bright output of the laser units replicates the image with a high increase in contrast.

Now referring to the drawing, there is shown by illustration an optical image amplifying system which comprises separate axially aligned laser material elements 11 and 12 of any well known type, for illustrative purposes shown as solid state material, operated either continuous wave or pulsed, according to well known practice in the art. In the event the laser material is of the solid state type such as ruby, the ends need not be coated with a reflective material because separate spherical reflective surfaces are positioned in axial alignment with the outer end of each of the laser elements and adjacent thereto. The laser elements are operated with a suitable light source 17 for exciting the atoms as is well known in the art.

In the event the laser material elements are of a gas type, each of the laser elements include an elongated cylindrical chamber which has end surfaces at Brewster's angle with suitable optical qualities for passing light waves without affecting their directional paths. Such laser elements include about ten parts helium to one part neon excited by a suitable RF or direct current power source 18.

A thin optical lens 14 is positioned on the axis between adjacent ends of the separate laser material elements. A fully reflecting spherical surface mirror 15 is positioned opposite the outer end of one laser element at a distance, $R_1$, from the thin lens, which is equal to the radius of curvature of the reflecting mirror surface 15 and to twice the focal length of the lens. A partially reflecting active spherical mirror surface 16 of about 99% reflectivity which passes a small portion, about 1%, of incident light therethrough is positioned on the axis opposite the outer end of the other laser material element at a distance $R_2$ equal to $R_1$, from the thin lens, which is equal to the radius of curvature of the spherical partially reflective surface 16. It is well known in the laser art that a change in reflectivity of one reflective surface from about 99% to about 98% causes the laser operation to cease in the affected modes.

The present invention makes use of the above knowledge of laser operation due to mirror reflectivity to carry out the teaching of the present invention. It has been determined that if a reflective surface is used that decreases its reflectivity when an image is applied onto the surface, that the oscillation mode for those surface areas that are so covered will cease to oscillate. An image is projected onto the fully reflective mirror which changes the reflectivity of the mirror surface. Those areas of the reflective surface that are not covered by the image reflects the light in the usual manner such that the laser operates to produce light waves that pass through the partially reflective mirror. The image is then outlined by the light that passes through the partially reflective mirror to produce an image onto a receiver. The intensity of the image imaged onto the partially reflective mirror is determined by the gain in the laser material and the reflectivity $r_1$ of the fully reflective surface upon which the image is projected which is imaged onto the corresponding point of reflectivity $r_2$ on the partially reflective mirror.

The amplification is $$e^{G(r_1 r_2) \frac{C \Delta \tau}{2(R_1 + R_2)}}$$

where G is the gain in the laser material, C is light velocity through the laser system, $2(R_1+R_2)$ is the round trip distance through the system and $\Delta\tau$ is the pulse time. The ratio of the intensities in the amplified image which is partially transmitted through the partially reflective surface can be given by $$e^{G(r_{1a} - r_{1b}) r_2 \frac{C \Delta \tau}{2(R_1 + R_2)}}$$

As long as G is large and $$\frac{C \Delta \tau}{2(R_1 + R_2)}$$

is large, a small difference in reflectivity in the image on the fully reflective surface will give rise to a high contrast in the image and thus a high intensity in the image.

In operation of the device, different images may be amplified by positioning different semitransparent films that contain an image over the reflective side of the fully reflective mirror surface. The image in the semitransparent film causes the covered portion of the fully reflective mirror surface to be less reflective causing those light producing portions of the laser material to cease operation. The bright output of the laser material produced by those portions of the fully reflective mirror surface not covered by the image causes the laser material to replicate the image with a vast increase in contrast. Changing the image containing semitransparent film will change the projection and amplification of different images.

Modification of the surface of the active fully reflective mirror surface with a coating of transparent film 21, the transparency of which may be changed by electron bombardment, makes the device suitable for operation with an electron gun 22 as illustrated in FIG. 2. The laser material element is herein shown by illustration as a gas type with the laser elements and the electron gun housed within an evacuated chamber or envelope for satisfactory operation of the electron gun, and associated electronics. The electron gun "writes" an image onto the film which decreases the reflectivity of the reflective surface over the image area which modulates the laser output as described above.

The device can be used for night vision wherein the image is written or projected onto the reflective surface by infrared radiation. For this application, the fully reflective mirror surface is coated with a film or transparent material whose absorptivity is a function of illumination and is insensitive to the laser frequency. Thus, an image can be projected onto the film by infrared, visible or ultraviolet light which then modifies the reflectivity of the mirror for the laser wavelength. Thus, the laser output is modulated similar to the above described operation by causing certain of the laser oscillations to cease due to the image projected onto the film applied to the reflective surface. An example of such a reflective surface is a film of $EuCl_2$ a few microns thick. When cooled below 20° K. such a film is transparent to visible light. Upon illumination by infrared radiation containing wavelengths of 7–14 microns, the film becomes opaque to red light and effectively controls the spatial oscillation mode of the laser material.

Operation for some applications can be carried out by use of a reflecting surface made of Selenium or some similar semiconductor material whose reflectivity is a function of illumination by radiation or of electrons. Thus, a single mirror surface may be used to replace the above described film coated-fully reflective mirror surface.

The operation of the system is the same as for any other laser system with the exception that an image or picture is projected onto or applied to the fully reflective mirror surface. The device as shown has a high gain available in pulsed or Q-switched lasers.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. In an image amplifier system which comprises:
    at least two laser oscillator elements secured relative to each other on an optical axis,
    pumping means operatively associated with each of said laser oscillator elements for exciting each of said oscillator elements,
    at least one optical lens positioned between each of said laser oscillator elements to focus light generated by each of the laser oscillator elements adjacent thereto,
    a fully reflective spherical mirror surface adjacent the outer end of an end laser oscillator element operative to reflect light through said adjacent laser oscillator element onto said optical lens,
    a partially reflective spherical mirror surface adjacent the outer end of another end laser oscillator of said laser oscillator elements operative to reflect light through said adjacent laser oscillator element onto an optical lens while passing some light through said partially reflective spherical mirror surface, and
    image producing means associated with said fully reflective mirror surface for placing an image onto the fully reflective mirror surface in the path of light waves from the end of the end laser oscillator element adjacent thereto reduce the reflectivity of said fully reflective surface in the areas covered by said image and thereby cause some oscillations in said laser oscillator element to cease,
    whereby light waves produced in the laser oscillator elements not affected by the image will continue to oscillate and emerge from the partially reflective surface through those areas on the partially reflective surface which are not affected by an image placed onto the fully reflective surface thereby producing the image in the output of the partially reflective mirror surface.

2. In an image amplifier as claimed in claim 1 wherein:
    said fully reflecting spherical mirror surface and said partially reflective spherical surface are positioned relative to said optical lens at a distance equal to their respective radius of curvature.

3. In an image amplifier as claimed in claim 2 wherein said laser oscillator element sare pulse operated.

4. In an image amplifier as claimed in claim 2 wherein said laser oscillator elements are continuous wave operated.

5. In an image amplifier system as claimed in claim 1, which includes, only two separate laser oscillator elements positioned in axial alignment relative to each other.

References Cited

UNITED STATES PATENTS

| 2,929,922 | 3/1960 | Schawlow et al. | 331—94.5 |
| 3,258,717 | 6/1966 | Katzman | 331—94.5 |
| 3,292,102 | 12/1966 | Byrne | 331—94.5 |
| 3,292,103 | 12/1966 | Soules et al. | 331—94.5 |

JEWELL H. PEDERSEN, *Primary Examiner.*

W. L. SIKES, *Assistant Examiner.*